(12) United States Patent
Mistry et al.

(10) Patent No.: US 12,021,710 B2
(45) Date of Patent: Jun. 25, 2024

(54) NETWORK ANALYTICS ENGINE INCORPORATING GEOSPATIAL MAPPING AND AREA OF INTEREST INFORMATION AND ASSOCIATED METHODS

(71) Applicant: T-Mobile USA, Inc., Bellevue, WA (US)

(72) Inventors: Bhavin Mistry, Bellevue, WA (US); Vikas Ranjan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/224,330

(22) Filed: Apr. 7, 2021

(65) Prior Publication Data

US 2022/0329501 A1    Oct. 13, 2022

(51) Int. Cl.
*H04L 41/50*  (2022.01)
*H04L 41/5067*  (2022.01)
*H04L 43/55*  (2022.01)

(52) U.S. Cl.
CPC ...... *H04L 41/5032* (2013.01); *H04L 41/5067* (2013.01); *H04L 43/55* (2022.05)

(58) Field of Classification Search
CPC ............. H04L 41/5032; H04L 41/5038; H04L 41/5067
See application file for complete search history.

(56) References Cited

U.S. PATENT DOCUMENTS

| | | | |
|---|---|---|---|
| 7,392,017 B2 | 6/2008 | Chu et al. | |
| 8,060,606 B2 | 11/2011 | Friedman et al. | |
| 8,164,442 B2 | 4/2012 | Ungari | |
| 8,370,483 B2 | 2/2013 | Choong et al. | |
| 8,878,871 B2 | 11/2014 | Clark et al. | |
| 9,092,502 B1 | 7/2015 | Cannaliato et al. | |
| 9,794,747 B2 | 10/2017 | Annamalai et al. | |
| 9,826,414 B2 | 11/2017 | Liu et al. | |
| 9,911,340 B2 | 3/2018 | Samarasekera et al. | |
| 9,948,349 B2 | 4/2018 | Malach | |
| 10,331,156 B2 | 6/2019 | Wepman et al. | |
| 10,638,270 B2 | 4/2020 | Baird et al. | |
| 10,817,889 B2 * | 10/2020 | Zachariah | G06Q 30/0639 |
| 10,867,696 B2 | 12/2020 | Bleicher et al. | |
| 2005/0004945 A1 * | 1/2005 | Cossins | H04W 4/029 |
| 2009/0002367 A1 * | 1/2009 | Alexis | G06T 17/05 345/419 |

(Continued)

*Primary Examiner* — Philip J Chea
*Assistant Examiner* — James Ross Hollister
(74) *Attorney, Agent, or Firm* — Lee & Hayes, P.C.

(57) ABSTRACT

A system including a processor configured together and analyzing network activity data associated with a plurality of network service providers, gather geographic reference data that includes information about locale(s) of interest, create bins and use spatial matching to associate network performance parameters with hex bins associated with the locale (s) of interest. Generate, based at least in part on the geographic network data, a geospatial map overlay for incorporation in an interactive graphical user interface (GUI), the geospatial map overlay comprising a visual indication of one or more areas of interest and associated aggregated network performance data, and identify and deploy one or more measures to improve network performance and thus customer experiences for at least one or more of the identified locale associated with a bin.

19 Claims, 7 Drawing Sheets

(56) References Cited

U.S. PATENT DOCUMENTS

| | | | |
|---|---|---|---|
| 2013/0157688 A1* | 6/2013 | Kateley | H04W 24/08 |
| | | | 455/456.1 |
| 2017/0293635 A1* | 10/2017 | Peterson | G06F 16/2477 |
| 2018/0035307 A1* | 2/2018 | Mahimkar | H04L 43/08 |
| 2020/0162336 A1* | 5/2020 | Gonguet | H04L 41/0893 |
| 2020/0245115 A1* | 7/2020 | Dorrance | G08G 1/0141 |
| 2020/0344641 A1 | 10/2020 | Veggalam et al. | |
| 2021/0035135 A1 | 2/2021 | Jat et al. | |
| 2021/0120436 A1* | 4/2021 | Raleigh | H04W 48/18 |
| 2021/0400501 A1* | 12/2021 | Wakim | G06Q 30/0201 |

\* cited by examiner

NETWORK ANALYTICS ENGINE INCORPORATING GEOSPATIAL MAPPING AND AREA OF INTEREST INFORMATION AND ASSOCIATED METHODS

FIELD

Examples of the present disclosure relate generally to network analytics systems and, more particularly, to systems and methods for network analytics incorporating geospatial mapping and area of interest information.

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on. These cell sites strive to provide adequate, reliable coverage for user equipment (UE) (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), 5G mobile communications network, IEEE 802.11 (WiFi), or other communication networks. The UEs can seek access to the telecommunications network for various services provided by the network, such as services that facilitate the transmission of data over the network and/or provide content to the UEs.

As the number of UEs and features available such devices has increased, so have user expectations of wireless accessibility wherever they may be. People expect seamless access at home, at work, at shops, in transit, and at any and all special events (e.g., sporting events, concerts, etc.). As a result, most telecommunications networks have to contend with issues of network congestion. Network congestion is the reduced quality of service that occurs when a network node carries more data than it can handle. Typical effects include queueing delay, packet loss or the blocking of new connections, overall resulting in degraded customer experience. To keep pace with rising demand and avoid such issues, wireless service providers continually evaluate wireless network performance to ensure the highest quality of service is delivered to users.

Providers may assess network performance based on a variety of performance indicators. The large amounts of network users and the ever-increasing geographic footprint of communication efforts makes this analysis cumbersome and expensive. There is a tradeoff between gathering enough data to get a full perspective of the network's performance, while still being able to maintain enough of a small-scale view to know how to improve network performance.

Accordingly, there is a need for improved systems and methods for analyzing network performance by a plurality of network service providers. More specifically, a need exists for providing systems and methods for network analytics incorporating geospatial mapping and area of interest information. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
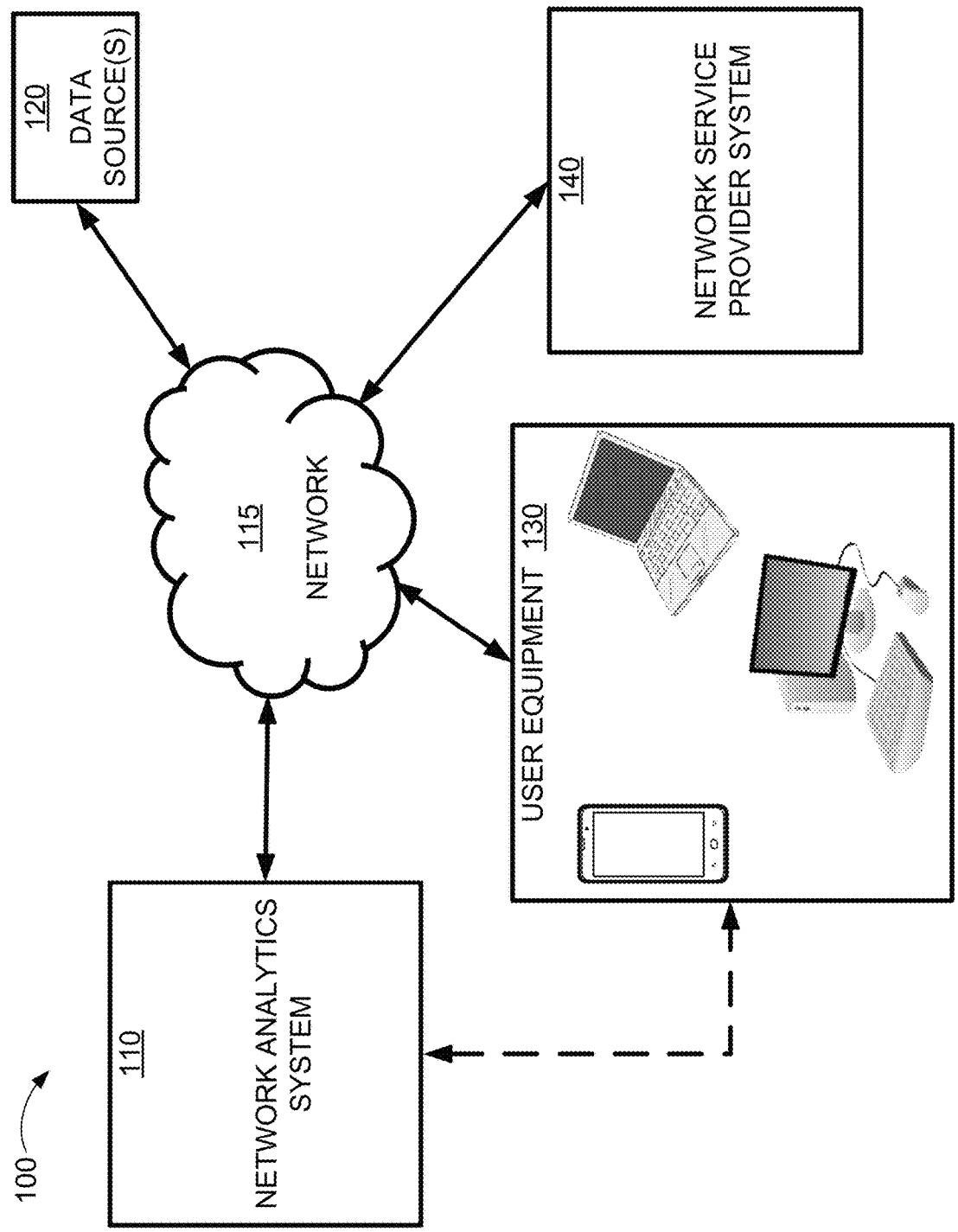
FIG. 1 is a diagram of an example of a system environment for network analytics including a network analytics system, data sources, and user equipment (UE) in accordance with some examples of the present disclosure.

As mentioned above, telecommunication service providers seek to improve customer experience by minimizing network degradation. This is typically achieved by deploying congestion management and/or network improvement solutions at one or more cell sites. The decision for where to deploy such solutions is based on network analysis that indicates areas of reduced network performance. Due to the amount of cellular network data, existing data analysis tools are directed to macro level analysis, which typically results in deploying solutions at congested cell sites. Unfortunately, such solutions are unable to address more micro level analysis and implementations. While the term "customer" is used in the application, one of skill in the art will understand that the concepts discussed herein will similarly apply to other users, who may or may not be customers of a telecommunications service provider. Further, customer may not be limited to a single user, but instead to a locale (e.g., a building, event venue, etc.) or an aggregate of users.

To solve these and other problems, the inventors have developed a network analytical system for analyzing network performance by a plurality of network service providers incorporating geospatial mapping and area of interest information. The improved analytical system provides for both macro and micro level analysis and review of the systems thus allowing for the implementation of a broad array of solutions. The system does this by identifying location(s) of interest (e.g., geographic regions, highways, airports, buildings in a downtown region, event venues, metropolitan statistical areas, etc.). Once area of interest location(s) are identified, then the system can gain a better understanding of the areas of interest and service to associated customers, and deploy/implement/execute one or more optimum customer experience improvement solutions at the identified sites. For example, the system can evaluate the sites and implement solutions at the identified sites to ensure that they have enough capacity to provide good coverage to the customers, thus, enhancing the overall customer experience. Further, the system can provide comparative data for various network providers performance at the identified area of interest, which can be helpful for making competitive improvement determinations.

The network analytics system improves network performance and thus customer experience by gathering and analyzing network activity data (e.g., location specific records, call data records, timing advance value, application usage data, etc.) associated with a plurality of network service providers. As part of the analysis, the system extracts values of certain parameters for each collected record—location (latitude, longitude), RF signal, data received, data used, time stamp, duration of usage, etc. As will be appreciated, for instances where there is also timing interest (e.g., network performance during a specified time such as during an event), the system can also aggregate performance metrics based on time intervals. The system can also gather geographic reference data that includes information about locale(s) of interest and then creates bins (for example, hexagonal bins) and uses spatial matching to associate network performance parameters with hex bins associated with the locale(s) of interest. After associating the network performance analysis with the created hex bins, the system can identify and deploy one or more measures to improve network performance and thus customer experiences for at least one or more of the identified locales associated with a bin. Examples of network improvement measures include, but are not limited to, adding spectrum, sector additions to reuse spectrum, adding cell sites (macro, micro or small cell), adding technology capabilities (e.g., support for 4G, 5G, etc.), location intelligence based measures, upsales to customers, targeted advertising, special promotions, content only for certain customers, and so on.

Further, the system can generate a graphic user interface (GUI), that includes geographic overlays depicting network performance for generated bins associated with the locale(s) of interest. The generated GUI can include a plurality of dynamic tools allowing for various visual and graphical analysis. For example, GUI can provide for competitive analysis of performance by a variety of network performance providers at the given locale(s) of interest. Further, GUI can provide for dynamic tools that allow a user to propose theoretic improvement measures and get a real time estimate of the improved network performance.

Although aspects of the present disclosure are generally discussed with reference to UEs and service providers, this is merely an example. One of ordinary skill will recognize that aspects of the present disclosure may be applied to various fields and challenges. As a non-limiting example, the proposed networks analytics system can also be used in conjunction with one or more UEs or other devices capable of switching between one or more network providers (e.g., through various access points).

These issues can be especially significant where needed systems may not be readily predictable. For instance, user equipment must communicate with numerous network access points to connect to cellular, WiFi®, or other network types to maintain telephone and data services. These network access points are continuously added, removed, and updated. Furthermore, network access (e.g., to cellular network) is provided by and among a plurality of network providers. For example, cellular providers each have their own nodes that connect UEs to cellular networks. To extend cellular coverage over a larger geography, cellular providers utilize each other's network nodes. For UEs capable of utilizing access points controlled by both known entities (e.g., a cellular provider to which the UE subscribes) and unknown entities (e.g., third-party connection point), the networks analytics system can perform analysis of areas of interest and can transmit information to the UE regarding an access point or a given network provider with the best network quality and the UE can, in response, dynamically connect with the access point or a given network provider.

In addition to UEs, other devices could benefit from such technical improvements. For example, self-driving cars and/or autonomous drones may communicate with the network's analytics system to determine the best providers for a given location of interest. Further, the system may determine the best providers and access points to ensure network reliability along a route to be taken by the vehicle.

In the following description, for the purposes of explanation, numerous specific details are set forth in order to provide a thorough understanding of implementations, embodiments, or examples of the present technology. It will be apparent, however, to one skilled in the art that implementations of the present technology can be practiced without some of these specific details.

The phrases "in some implementations," "according to some implementations," "in the implementations shown," "in other implementations," "in some embodiments," "according to some embodiments," "in the embodiments shown," "in other examples," "in some examples," "according to some examples," "in the examples shown," "in other examples," and the like generally mean the specific feature, structure, or characteristic following the phrase is included in at least one implementation of the present technology and can be included in more than one implementation, embodiment, or example. In addition, such phrases do not necessarily refer to the same implementations or different implementations.

Reference will now be made in detail to aspects of the disclosed technology, examples of which are illustrated in the accompanying drawings and disclosed herein. Wherever convenient, the same references numbers will be used throughout the drawings to refer to the same or like parts.

As shown in FIG. 1, an example of the present disclosure can comprise a system environment 100 for analyzing network performance by a plurality of network service providers in accordance with some examples of the present disclosure. The components and arrangements shown in FIG. 1 are not intended to limit the disclosed embodiments as these components and features may vary. In FIG. 1, the system environment 100 can include a network 115, one or more data source(s) 120, one or more UE 130, one or more network service provider systems 140. In some examples, one or more data source(s) 120, one or more UE 130, and network service provider system 140 can communicate with one another via network 115. The user equipment 130, network service provider system 140, and network analytics system 110 can each include one or more processors, memories, boot processors, and/or transceivers.

As non-limiting examples, the one or more UEs 130 may be cell phones, smartphones, laptop computers, tablets, or other personal computing devices that include the ability to communicate on one more different types of networks. The network analytics system 110, and/or the network service provider systems 140 may include one or more physical or logical devices (e.g., servers, cloud servers, access points, etc.) or drives. Example computer architectures that may be used to implement the UEs 130, the networks analytics system 110, and the network service provider system 140 are described below with reference to FIGS. 5 and 6.

Network analytical system 110 can be configured to analyze network performance by a plurality of network service providers and to incorporate geospatial mapping and area of interest information. The system 110 can receive one or more types of data from data source(s) 120 over network 115. Network 115 can include cellular wireless network such as GSM, CDMA, GPRS, EDGE, UMTS, WiMAX, LTE, etc. The network 115 may also be the internet or may be implemented using unlicensed wireless technologies such as IEEE 802.11. Network analytical system 110 can be further configured to receive and/or identify location(s) of interest. For example, the system 110 can identify or receive geographic regions, highways, airports, buildings in a downtown region, event venues, metropolitan statistical areas, and other locations data/information where associated network analytical data is desired. The system 110 can also gather geographic reference data that includes information about locale(s) of interest and then create bins (for example, hexagonal bins) and use spatial matching to associate network performance parameters with hex bins associated with the locale(s) of interest. After associating the network performance analysis with the created hex bins, the system 110 can identify and deploy one or more measures to improve network performance and thus customer experiences for at least one or more of the identified locales associated with a bin.

Figure 4:
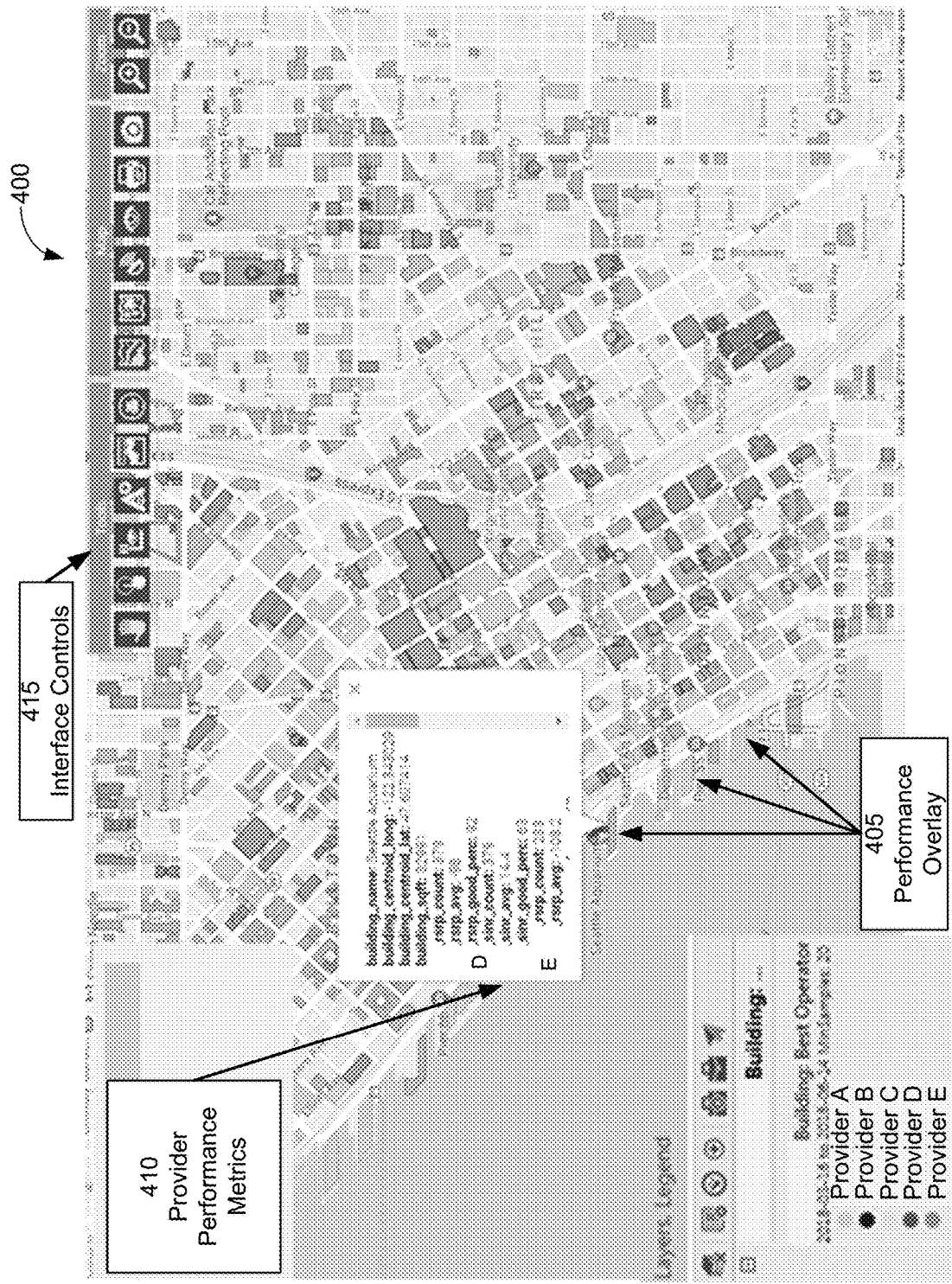
FIG. 4 is an example graphic user interface (GUI) generated by a network analytics system, in accordance with some examples of the present disclosure.

Further, the system 110 can generate a GUI 400 depicted and described further herein with reference to FIG. 4. The generated GUI 400 can include geographic overlays depicting network performance for generated bins associated with the locale(s) of interest. Further, the GUI 400 can include a plurality of dynamic tools allowing for various visual and graphical analysis. For example, GUI 400 can provide for competitive analysis of performance by a variety of network performance providers at the given locale(s) of interest. Further, GUI 400 can provide for dynamic tools that allow a user to propose theoretic improvement measures and get a real time estimate of the improved network performance.

Figure 2:
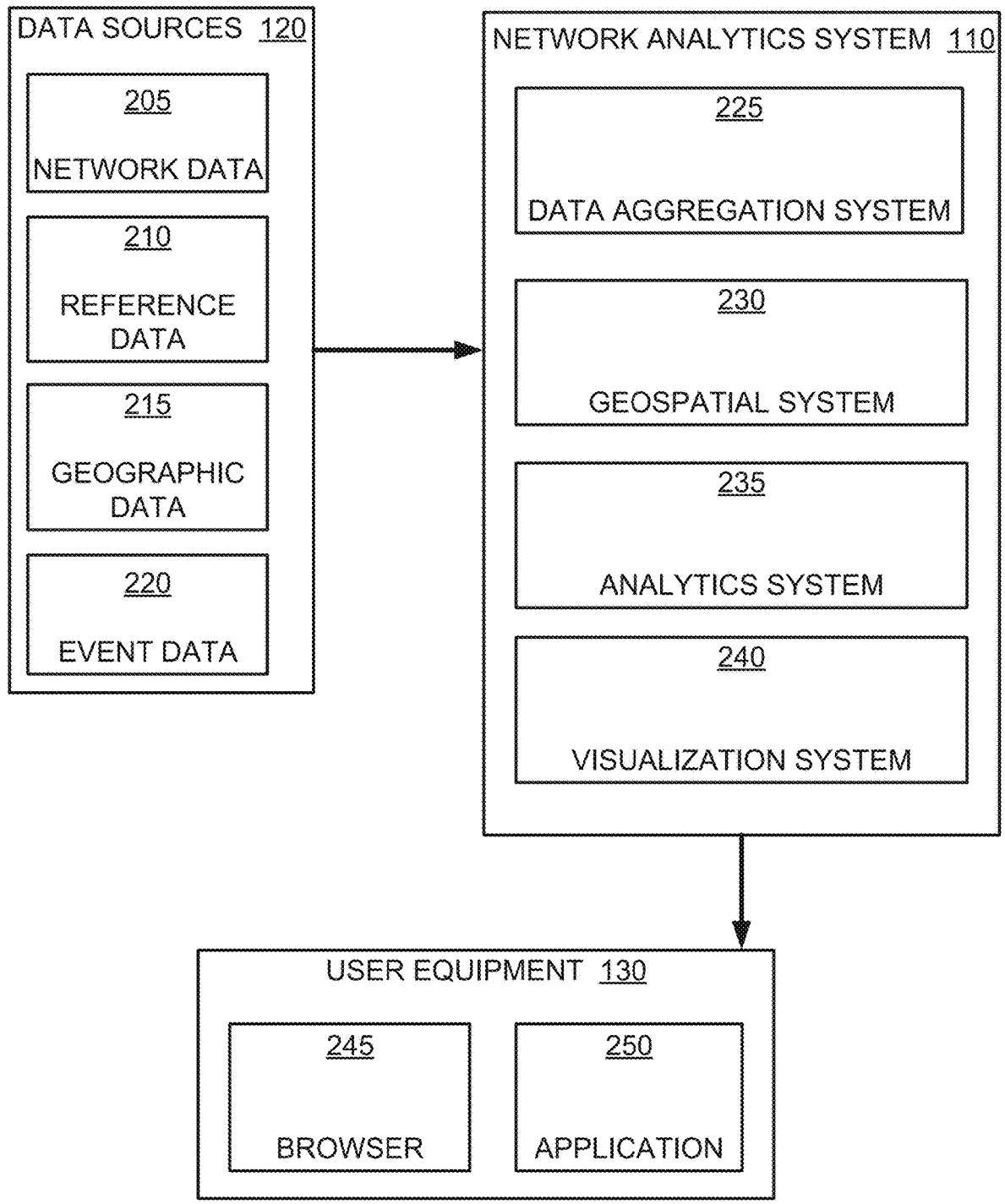
FIG. 2 is a block diagram depicting an example network analytics system, in accordance with some examples of the present disclosure.
Figure 3:
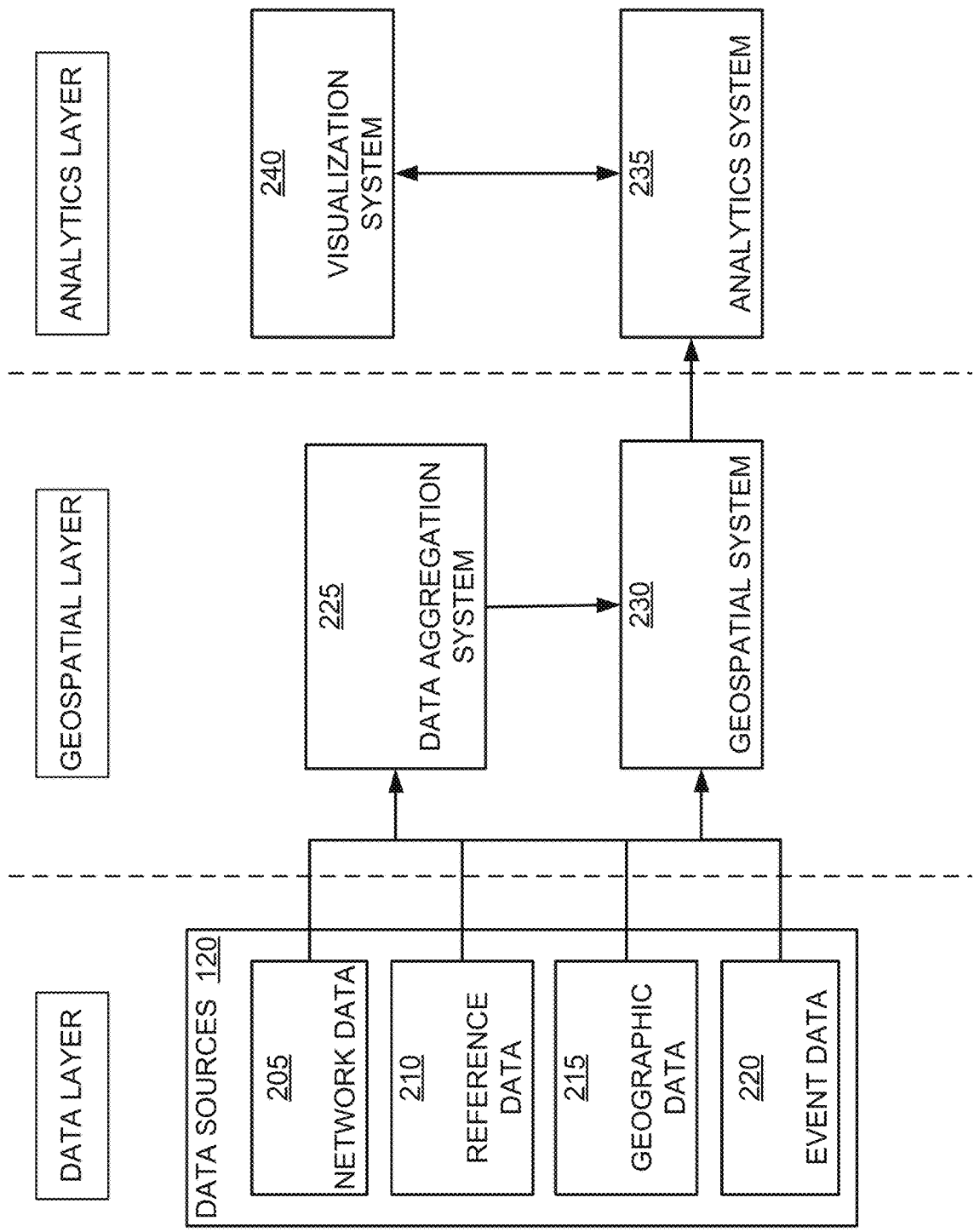
FIG. 3 is a flowchart data flow through a network analytics system, in accordance with some examples of the present disclosure.

FIG. 2 depicts a block diagram depicting an example network analytics system 110 and FIG. 3 depicts data flow through a network analytics system 110. As depicted, network analytics system 110 can include data aggregation system 225, geospatial system 230, analytics system 235 and visualization system 240. As shown, network analytics system 110 receives one or more types of data from data sources 120. As depicted, data sources 120 may include one or more of network data 205, reference data 210, geographic data 215, and event data 220. As further depicted, network analytics system can generate visual analytical data and transmit such data to UE 130 via one or more of a browser 245 or standalone application 250.

The data aggregation system 225 is configured and/or programmed to receive a data from the one or more data sources 120. For example, data aggregation system 225 may receive one or more of network data 205, reference data 210, geographic data 215, and event data 220. The data aggregation system 225 can be configured to integrate, cleanse, and standardize the various types of received data. Further, data aggregation system 225 can be configured to join and aggregate the data.

Network data 205 can include network usage data associated with customer's access of services/utilities associated with a telecommunications network. Reference data 210 can include geospatial and geographic references data. For example, reference data 210 can include a plurality of shapefiles associated with locations of interest. Geographic data 215 can include data indicative of the location of one or more UE 130. Event data 220 can include data associated with geospatial events such as tracking data, telemetry data, sensor data, and the like.

Data aggregation system 225 can be configured to collect, receive, or access one or more of the previously described data types. For example, the data aggregation system 225 collects/receives/accesses one or more of the following usage data records associated with network customers relating to the following types of information: location specific records (LSR), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third-party, application owner, etc.). Examples of other types of data collected by the usage data collection module include, but are not limited to, data collected from third party applications (e.g., including crowdsourced data) and a plurality of network service provider systems 140.

The usage data records associated with the customer can comprise information about an associated customer location and an associated timestamp. For example, a call data record for a customer can identify a customer's location and a timestamp when the call was initiated. The usage data aggregation system 225 can collect usage records that span a particular period of time depending on, for example, density of usage records, usage activity, types of usage records (for example, text, voice, video, app-usage, emergency services, etc.), services/products to be offered to the customer, types of customer experience enhancement solutions/actions to be implemented, source of usage records, and so on.

The geospatial system 230 can be configured to configured to collect, receive, or access one or more of the previously described data types. For example, geospatial system 230 can be configured to collect, receive, or access shapefiles and other reference data associated with locations of interest. In some examples, the data can be loaded into a geospatial framework. The geospatial system 230 can then create bins associated with the framework. The bins represent a span of area covered by the site and can be described using a variety of shapes. For example, the system 230 can generate hexagonal bins. Further, other shapes, such as circles, squares, rectangles, or any other polygon can also be used. The geospatial system 230 can then use spatial matching to associate, or relate, network performance parameters with the bins associated with the locale(s) of interest. In some embodiments, after geospatial system 230 associates the network performance analysis with the created hex bins, visualization system 240 can generate, based at least in part on the geographic network data, a geospatial map overlay for incorporation in an interactive GUI, such as later discussed GUI 400. The geospatial map overlay can include a visual indication of one or more areas of interest and associated aggregated network performance data. Further, overlay can differentiate between a plurality of providers systems 140, thus allowing for quick visual comparative analysis.

After associating the network performance analysis with the created hex bins, the analytics system 235 can identify one or more measures to improve network performance and thus customer experiences for at least one or more of the identified locale associated with a bin. Examples of network improvement measures include, but are not limited to, adding spectrum, sector additions to reuse spectrum, adding cell sites (macro, micro or small cell), adding technology capabilities (e.g., support for 4G, 5G, etc.), location intelligence based measures, upsales to customers, targeted advertising, special promotions, content only for certain customers, and so on. The network performance improvement actions are intended to enhance overall customer experience. Examples of network performance improvement actions include, but are not limited to: adding spectrum to the identified locale(s) of interest, removing spectrum from the identified at least one site, adding cell site proximate to the identified locale(s) of interest, removing cell site proximate to the identified locale(s) of interest, displacing cell site proximate to the identified locale(s) of interest, adding or enhancing at least one technology capability for the identified locale(s) of interest, implementing a cell split, deploying a small cell, adding/removing a sector, enhancing sector capacity, adding/removing a cell on wheels, adding/removing a tower, adding/removing hot spots, modifying capacity at the identified locale(s) of interest. Additionally or alternatively, the network performance improvement actions comprises providing one or more of the following services to the customer (free or at reduced rates for a period of time): gaming, home security, music, videos, advertising, offers, rebates, location intelligence, upsales, partnerships with other companies, special content. Further, analytics system 235 can generate estimated network performance data based on implementation of the network improvement measure. As will be appreciated, such a feature allows for dynamic adjustment and analysis of network performance and potential improvements.

As previously discussed, UEs or other devices may be capable of switching between one or more network providers. In such an embodiment, analytics system 235 can be configured to identify geographic locations of UEs 130. Further, the analytics system 235 can perform analysis of the identified locations. For example, analytics system 235 can determine the most reliable network provider 140 for the identified location. Analytics system 235 can then transmit information to the UE 130 regarding an access point or a given network provider 140 with the best network quality and the UE 130 can, in response, dynamically connect with the access point or a given network provider.

As previously mentioned, visualization system 240 can generate, based at least in part on the geographic network data, a geospatial map overlay for incorporation in an interactive GUI, such as later discussed GUI 400. The geospatial map overlay can include a visual indication of one or more areas of interest and associated aggregated network performance data. Further, overlay can differentiate between a plurality of providers systems 140, thus allowing for quick visual comparative analysis. Additionally, based on proposed improvement measures, visualization system 240 can generate, based at least in part on the geographic network data and the estimated network improvement data, an estimated geospatial map overlay. The estimated geospatial map overlay can include updated visual indications/overlays of one or more areas of interest and associated estimated aggregated network performance data.

FIG. 4 is an example GUI 400 generated by a network analytics system 110. As shown, GUI 400 can include overlays 405 depicting network performance for generated bins associated with the locale(s) of interest. GUI 400 can further include various provider performance metrics 410 as well as a legend depicting various distinctions between providers. For example, GUI 400 can include a legend that identifies, by color, various indicators associated with provider performance overlays 405. Further, the GUI 400 can include one or more dynamic interface controls 415 allowing for visual manipulation and graphical analysis. For example, GUI 400 can include tools that allow the system to receive, via a user interface, an indication of a network improvement action, wherein the network improvement action comprises an improvement or upgrade to the physical network to improve the geographic performance of at least one of the plurality of network service providers in the one or more areas of interest. Based on receiving such an action, the system 110 can generate estimated network performance data based on implementation of the network improvement action. The system 110 can further generate, based at least in part on the geographic network data and the estimated network improvement data, an estimated geospatial map overlay for incorporation into the GUI 400. The estimated geospatial map overlay can include an updated visual indications/overlays 405 of one or more areas of interest and associated estimated aggregated network performance data.

Figure 5:
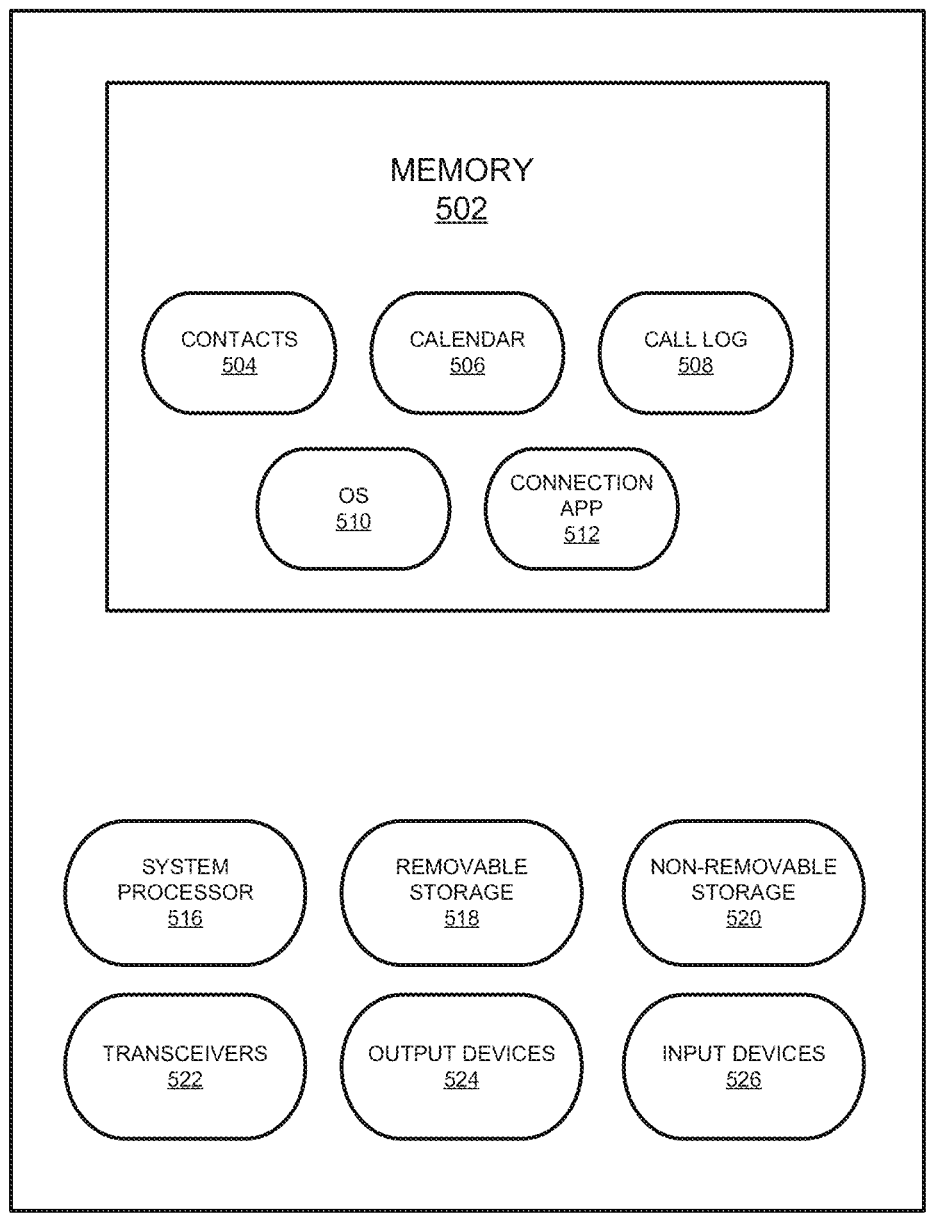
FIG. 5 is an example of a UE for use with the systems and methods disclosed herein, in accordance with some examples of the present disclosure.

As shown in FIG. 5, some, or all, of the system environment 100 and associated methods may be performed by, and/or in conjunction with, the UE 130. For clarity, the UE 130 is described herein generally as a cell phone or smartphone. One of skill in the art will recognize, however, that the system environment 100 and methods may also be used with a variety of other electronic devices, such as, for example, tablet computers, laptops, desktops, and other network (e.g., cellular or IP network) connected devices from which a call may be placed, a text may be sent, and/or data may be received. These devices are referred to collectively herein as the UE 130. The UE 130 may comprise a number of components to execute the above-mentioned functions and apps. As discussed below, the UE 130 may comprise memory 502 including many common features such as, for example, contacts 504, a calendar 506, a call log (or, call history) 508, operating system (OS) 510, and one or more applications, such as connection app 512.

The UE 130 may also comprise one or more system processors 516. In some implementations, the system processor(s) 516 can include a central processing unit (CPU), a graphics processing unit (GPU), or both CPU and GPU, or any other sort of processing unit. The UE 130 may also include one or more of removable storage 518, non-removable storage 520, one or more transceiver(s) 522, output device(s) 524, and input device(s) 526. System processor 516 may be configured to receive a request to connect to an external device (e.g., another UE 130, analytics system 110, or provider system 120). The request may be received through input device 526 and/or through automatic routing.

In various implementations, the memory 502 may be volatile (such as random-access memory (RAM)), non-volatile (such as read-only memory (ROM), flash memory, etc.), or some combination of the two. The memory 502 may include all, or part, of the functions 504, 506, 508, 512, and the OS 510 for the UE 130, among other things.

The memory 502 may also comprise contacts 504, which can include names, numbers, addresses, and other information about the user's business and personal acquaintances, among other things. In some examples, the memory 502 may also include a calendar 506, or other software, to enable the user to track appointments and calls, schedule meetings, and provide similar functions. In some examples, the memory 502 may also comprise the call log 508 of calls received, missed, and placed from the UE 130. As usual, the call log 508 may include timestamps for each call for use by the system environment 100. Of course, the memory 502 can also include other software such as, for example, e-mail, text messaging, social media, and utilities (e.g., calculators, clocks, compasses, etc.).

The memory 502 may also include the OS 510. Of course, the OS 510 varies depending on the manufacturer of the UE 130 and currently comprises, for example, iOS 12.1.4 for Apple products and Pie for Android products. The OS 510 contains the modules and software that supports a computer's basic functions, such as scheduling tasks, executing applications, and controlling peripherals.

As mentioned above, the UE 130 may also include the connection app 512. The connection app 512 may perform some, or all, of the functions discussed above with respect to the methods, for interactions occurring between the UE 130 and an external device (e.g., another UE 130, network provider systems 140, and/or analytics system 110).

The UE 130 may also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the functions 504, 506, 508, 512, and the OS 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 130. Any such non-transitory computer-readable media may be part of the UE 130 or may be a separate database, databank, remote server, or cloud-based server.

In some implementations, the transceiver(s) 522 may include any sort of transceivers known in the art. In some examples, the transceiver(s) 522 can include a wireless modem to facilitate wireless connectivity with the other UEs, the Internet, and/or an intranet via a cellular connection. Further, the transceiver(s) 522 may include a radio transceiver that performs the function of transmitting and receiving radio frequency communications via an antenna (e.g., Wi-Fi or Bluetooth®). In other examples, the transceiver(s) 522 may include wired communication components, such as a wired modem or Ethernet port, for communicating with the other UE or the provider's Internet-based network. In this case, the transceiver(s) 522 can also enable the UE 130 to communicate with the analytics system 110 and provider systems 140, as described herein.

In some implementations, output device(s) 524 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 524 can play various sounds based on, for example, whether the UE 130 is connected to a network, the type of call being received (e.g., video calls vs. voice calls), the number of active calls, etc. Output device(s) 524 also include ports for one or more peripheral devices, such as headphones, peripheral speakers, or a peripheral display.

In various implementations, input device(s) 526 includes any sort of input device(s) known in the art. The input device(s) 526 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
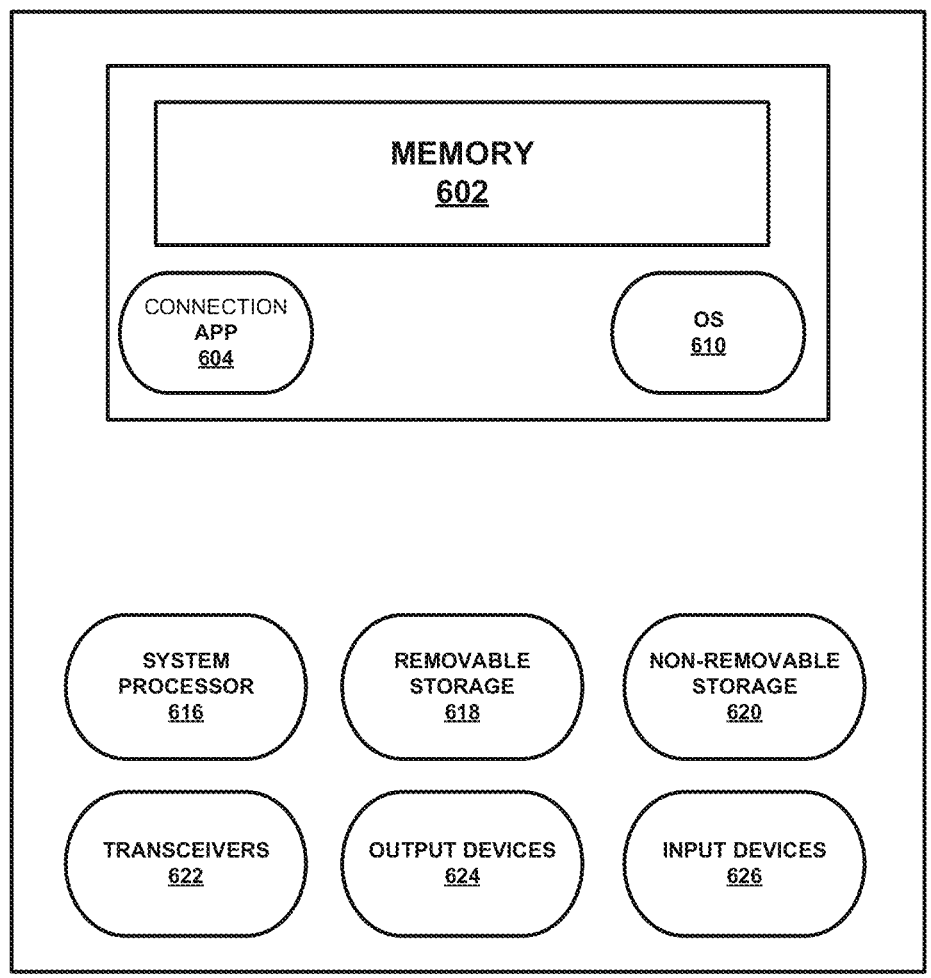
FIG. 6 is an example of a server for use with the systems and methods disclosed herein, in accordance with some examples of the present disclosure.

As shown in FIG. 6, the system environment 100 may also be used in conjunction with a server 600 (e.g., network analytics system 110 and/or network service providor system 140). The server 600 can comprise, for example, a desktop or laptop computer, a server, bank of servers, or cloud-based server bank. Thus, while the server 600 is depicted as single standalone servers, other configurations or existing components could be used. In some examples, the server 600 may comprise existing network entities such as, for example, a home location register (HLR), home subscriber service (HSS), a third-generation partnership project authentication, authorization and accounting (3GPP AAA) server, or another server or component. The server 600 may implement aspects of network analytics system 110 and/or network service providor system 140.

The server 600 may comprise a number of components to execute the above-mentioned functions and apps. As discussed below, the server 600 may comprise memory 602 including many common features such as, for example, the OS 610.

In various implementations, the memory 602 may be volatile (such as random access memory (RAM)), non-volatile (such as read only memory (ROM), flash memory, etc.), or some combination of the two. The memory 602 may include all, or part, of the functions of a connection app 604, among other things. The memory 602 may also include the OS 610. Of course, the OS 610 varies depending on the manufacturer of the server 600 and the type of component. Many servers, for example, run Linux or Windows Server. Dedicated cellular routing servers may run specific telecommunications OS 610. The OS 610 contains the modules and software that supports a computer's basic functions, such as scheduling tasks, executing applications, and controlling peripherals.

As shown in FIG. 6, the server 600 can include a connection app 604 which may provide communication between the server 600 and external systems (e.g., the UE 130, data sources 120, and/or network service providor system 140). The server 600 may also comprise one or more system processors 616. In some implementations, the system processor(s) 616 can include a central processing unit (CPU), a graphics processing unit (GPU), or both CPU and GPU, or any other sort of processing unit. The server 600 may also include one or more of removable storage 618, non-removable storage 620, one or more transceiver(s) 622, output device(s) 624, and input device(s) 626.

The server 600 may also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 may store some, or all, of the OS 610 and connection app 604.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information and which can be accessed by the server 600. Any such non-transitory computer-readable media may be part of the server 600 or may be a separate database, databank, remote server, or cloud-based server.

In some implementations, the transceiver(s) 622 include any sort of transceivers known in the art. In some examples, the transceiver(s) 622 may include a wireless modem to facilitate wireless connectivity with the UEs 130, additional servers, the Internet, and/or an intranet via a cellular connection. Further, the transceiver(s) 622 may include a radio transceiver that performs the function of transmitting and receiving radio frequency communications via an antenna (e.g., Wi-Fi or Bluetooth®). In other examples, the transceiver(s) 622 may include wired communication components, such as a wired modem or Ethernet port, for communicating with the other UEs or the provider's Internet-based network.

In some implementations, the output device(s) 624 may include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 600 is connected to a network, the type of data being received (e.g., a match vs. a request for service listings), when SIM-OTA messages are being transmitted, etc. Output device(s) 624 may also include ports for one or more peripheral devices, such as headphones, peripheral speakers, or a peripheral display.

In various implementations, input device(s) 626 includes any sort of input devices known in the art. For example, the input device(s) 626 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 7:
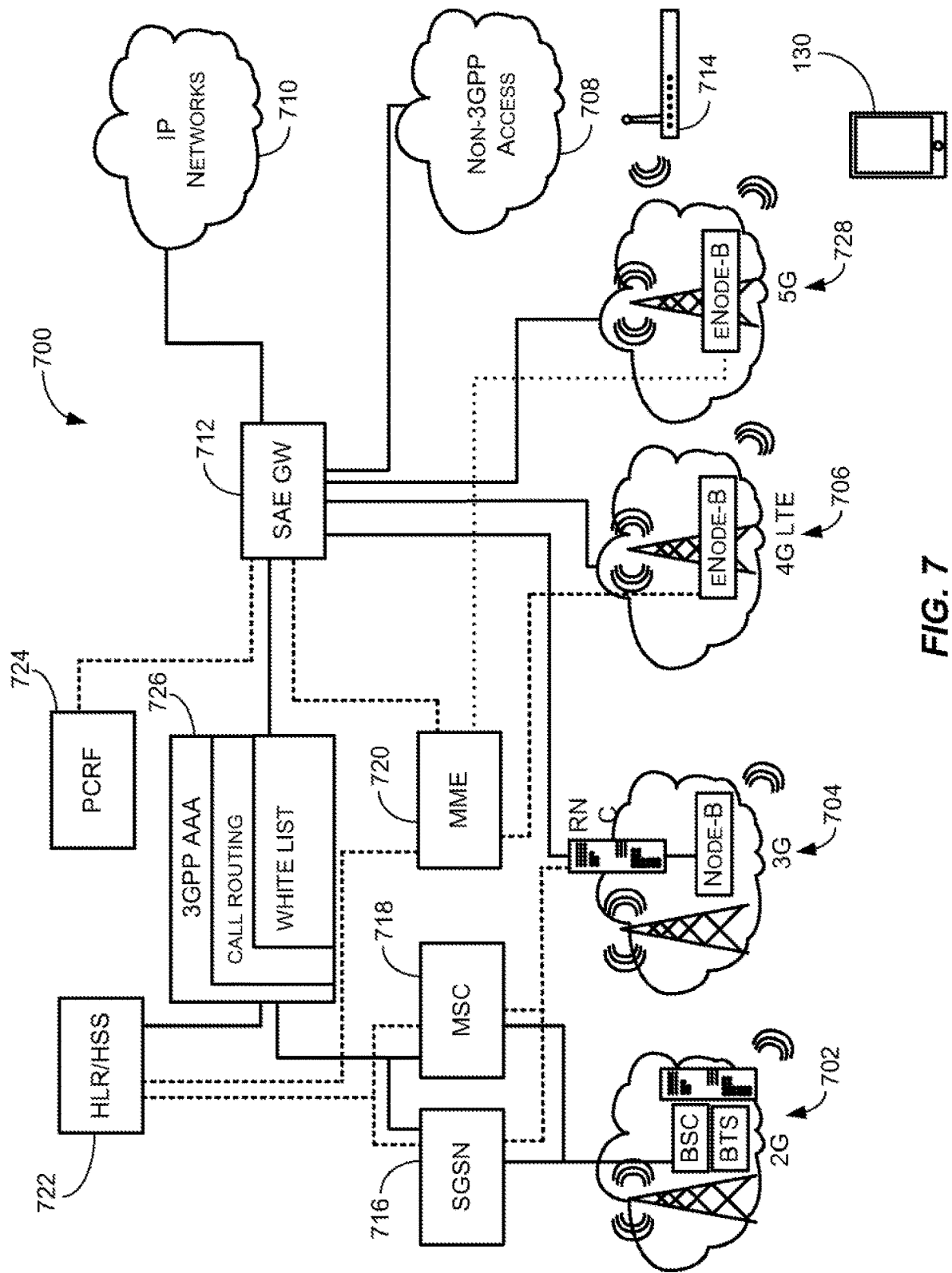
FIG. 7 is an example cellular and internet protocol network for use with some examples of the present disclosure.

FIG. 7 depicts a conventional cellular network 700 including 2G 702, 3G 704, 4G long-term evolution (LTE) 706, and 5G 728 components. Of course, future technologies, such as, for example, 7G and device-to-device (D2D) components could also be included and are contemplated herein. Many of the "back-end" components of network 700 could handle some, or all, of system environment 100 and methods associated with network analysis and improvement described herein.

As is known in the art, data may be routed from the Internet or other sources using a circuit switched modem connection (or non-3GPP connection) 708, which provides relatively low data rates, or via IP based packet switched 710 connections, which results is higher bandwidth. LTE system 706, which is purely IP based, essentially "flattens" the architecture, with data going straight from the interne to service architecture evolution gateway (SAE GW) 712 to evolved Node B transceivers 706, enabling higher through-put. UE 130 also has wireless local area network (WLAN) 714 capabilities, in some cases enabling even higher throughput. In some cases, cellular carriers may use WLAN communications in addition to, or instead of, cellular communications to supplement bandwidth.

Serving GPRS support node (SGSN) 716 is a main component of the general packet radio service (GPRS) network, which handles all packet switched data within the network 700 (e.g., the mobility management and authentication of the users). MSC 718 essentially performs the same functions as SGSN 716 for voice traffic. MSC 718 is the primary service delivery node for global system for mobile communication (GSM) and code division multiple access (CDMA), responsible for routing voice calls and short messaging service (SMS) messages, as well as other services (such as conference calls, fax, and circuit switched data). MSC 718 sets up and releases the end-to-end connection, handles mobility and hand-over requirements during the call, and takes care of charging and real time pre-paid account monitoring.

Similarly, mobility management entity (MME) 720 is the key control-node for 4G LTE network 706 and 5G 728. It is responsible for idle mode UE 130 paging and tagging procedures including retransmissions. MME 720 is involved in the bearer activation/deactivation process and is also responsible for choosing SAE GW 712 for UE 130 at the initial attach and at time of intra-LTE handover involving Core Network (CN) node relocation (i.e., switching from one cell tower to the next when traveling). MME 720 is responsible for authenticating the user (by interacting with the HSS 722 discussed below). The Non-Access Stratum (NAS) signaling terminates at the MME 720 and it is also responsible for generation and allocation of temporary identities to UE 130. The MME 720 also checks the authorization of UE 130 to camp on the service provider's HPLMN or VPLMN and enforces UE 130 roaming restrictions on the VPLMN. MME 720 is the termination point in the network for ciphering/integrity protection for NAS signaling and handles the security key management. MME 720 also provides the control plane function for mobility between LTE 706 and 2G 702/3G 704 access networks with an S3 interface terminating at MME 720 from SGSN 716. MME 720 also terminates an S7a interface towards home HSS 722 for roaming UE 130.

Referring to 5G 728, MME 720 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network.

In response to receiving a create session request, the network slice selector may determine which of the available network slices should be used to provide services for UE 130 and may redirect the create session request to the selected network slice. For example, the create session request may be directed to a gateway component of the selected network slice. Specific for a 5G network, the gateway component may comprise a user plane forwarding function.

HSS/HLR 722 is a central database that contains user-related and subscription-related information. The functions of HSS/HLR 722 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

The policy and charging rules function (PCRF) 724 is a software node that determines policy rules in network 700. PCRF 724 generally operates at the network core and accesses subscriber databases (e.g., HSS/HLR 722) and other specialized functions, such as enhanced e911 call handling, in a centralized manner. PCRF 724 is the main part of network 700 that aggregates information to and from network 700 and other sources (e.g., IP networks 710). PCRF 724 may support the creation of rules and then may automatically make policy decisions for each subscriber active on network 700. PCRF 724 may also be integrated with different platforms like billing, rating, charging, and subscriber database or may also be deployed as a standalone entity.

Finally, 3GPP AAA server 726 performs authentication, authorization, and accounting (AAA) functions and may also act as an AAA proxy server. For WLAN 714 access to (3GPP) IP networks 710 3GPP AAA Server 726 provides authorization, policy enforcement, and routing information to various WLAN components. 3GPP AAA Server 726 may generate and report charging/accounting information, performs offline charging control for WLAN 714, and perform various protocol conversions when necessary.

While several possible examples are disclosed above, examples of the present disclosure are not so limited. While the system environment 100 and methods, and or data flows, described and discussed herein with reference to use with cellular communications, for instance, the system environment 100 and methods can be used for other types of wired and wireless communications. In addition, while various functions are discussed as being performed on the UE 130, by the provider system 140, or system 110, other components could perform the same or similar functions without departing from the spirit of the present disclosure.

The specific configurations, machines, and the size and shape of various elements can be varied according to particular design specifications or constraints requiring a UE 130, server 600, system environment 100, or network 700 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A network analytical system for analyzing network performance by a plurality of distinct network service providers, the system comprising:
    one or more processors; and
    at least one memory in communication with the one or more processors and storing instructions that, when executed by the one or more processors, are configured to cause the system to:
        receive, via an interface of the network analytical system:
            network data comprising data related to network activity associated with the plurality of distinct network service providers,
            geographic reference data comprising data associated with one or more geographic regions, and
            geographic data indicative of a geographical location of a user equipment (UE);
        analyze and aggregate the network data to generate aggregated network performance data, wherein the aggregated network performance data includes associations with the plurality of distinct network service providers;
        receive, via a user interface, area of interest data comprising an indication of one or more areas of interest, the one or more areas of interest includes one or more buildings or event venues;
        relate, based at least in part on the area of interest data, the aggregated network performance data with the geographic reference data to generated geographic network data;
        generate, based at least in part on the geographic network data, a geospatial map overlay for incorporation in an interactive graphical user interface (GUI), the geospatial map overlay comprising a first visual indication depicting a geographic area associated with the one or more areas of interest and a second visual indication depicting a subset of the aggregated network performance data associated with the geographic area associated with the one or more areas of interest;
        select a network service provider from the distinct network service providers based on the geographical location and the aggregated network performance data; and
        connect the UE with the network service provider.

2. The system of claim 1, wherein the one or more processors, are further configured to cause the system to:
    provide, to a user device via a real time API configured to provide the interactive GUI, the geospatial map overlay.

3. The system of claim 1, wherein the one or more processors, are further configured to cause the system to:
    generate, based at least in part on the geographic network data, a network improvement mechanism, wherein the network improvement mechanism comprises an improvement or upgrade to a physical network to improve the geographic performance of at least one of the plurality of distinct network service providers in the one or more area of interest;
    generate estimated network performance data based on implementation of the network improvement mechanism;
    generate, based at least in part on the geographic network data and the estimated network performance data, an estimated geospatial map overlay for incorporation in the interactive graphical user interface, the estimated geospatial map overlay comprising an updated visual indication of one or more areas of interest and associated estimated aggregated network performance data.

4. The system of claim 3, wherein the network improvement mechanism comprises upsales to customers, targeted advertising, special promotions, or content restrictions for certain customer.

5. The system of claim 1, wherein the one or more processors, are further configured to cause the system to:
    receive, via a user interface, an indication of a network improvement action, wherein the network improvement action comprises an improvement or upgrade to a physical network to improve the geographic performance of at least one of the plurality of distinct network service providers in the one or more area of interest;
    generate estimated network performance data based on implementation of the network improvement action; and generate, based at least in part on the geographic network data and the estimated network performance data, an estimated geospatial map overlay for incorporation in the interactive graphical user interface, the estimated geospatial map overlay comprising an updated visual indication of one or more areas of interest and associated estimated aggregated network performance data.

6. The system of claim 5, wherein the network improvement action comprises adding spectrum, sector additions to reuse spectrum, or adding cell sites.

7. The system of claim 1, wherein the geographic reference data includes map reference data including one or more shapefiles.

8. The system of claim 1, wherein relating the aggregated network performance data with the geographic reference data to generated geographic network data comprises:
   receiving one or more shapefiles including geospatial data associated with areas of interest; and
   grouping, via hexagonal tessellation, the aggregated network performance data and the geospatial data.

9. A method for analyzing network performance by a plurality of distinct network service providers, the method comprising:
   receiving, via an interface of a network analytical system:
      network data comprising data related to network activity associated with the plurality of distinct network service providers,
      geographic reference data comprising data associated with one or more geographic regions, and
      geographic data indicative of a geographical location of a user equipment (UE);
   analyzing and aggregating network data to generate aggregated network performance data, wherein the aggregated network performance data includes associated with the plurality of distinct network service providers;
   receiving, via a user interface, area of interest data comprising an indication of one or more area of interest, the one or more areas of interest includes one or more buildings or event venues;
   relating, based at least in part on the area of interest data, the aggregated network performance data with the geographic reference data to generated geographic network data;
   generating, based at least in part on the geographic network data, a geospatial map overlay for incorporation in an interactive graphical user interface (GUI), the geospatial map overlay comprising a first visual indication depicting a geographic area associated with the one or more areas of interest and a second visual indication depicting a subset of the aggregated network performance data associated with the geographic area associated with the one or more areas of interest;
   selecting a network service provider from the distinct network service providers based on the geographical location and the aggregated network performance data; and
   connecting the UE with the network service provider.

10. The method of claim 9 further comprising:
   providing, to a user device via a real time API configured to provide the interactive GUI, the geospatial map overlay.

11. The method of claim 9 further comprising:
   generating, based at least in part on the geographic network data, a network improvement suggestion, wherein the network improvement suggestion comprises an improvement or upgrade to a physical network to improve the geographic performance of at least one of the plurality of distinct network service providers in the one or more area of interest;
   generating estimated network performance data based on implementation of the network improvement suggestion;
   generating, based at least in part on the geographic network data and the estimated network performance data, an estimated geospatial map overlay for incorporation in the interactive graphical user interface, the estimated geospatial map overlay comprising an updated visual indication of one or more areas of interest and associated estimated aggregated network performance data.

12. The method of claim 11, wherein the network improvement mechanism comprises upsales to customers, targeted advertising, special promotions, or content restrictions for certain customer.

13. The method of claim 9 further comprising:
   receiving, via a user interface, an indication of a network improvement action, wherein the network improvement action comprises an improvement or upgrade to a physical network to improve the geographic performance of at least one of the plurality of distinct network service providers in the one or more area of interest;
   generating estimated network performance data based on implementation of the network improvement action; and
   generating, based at least in part on the geographic network data and the estimated network performance data, an estimated geospatial map overlay for incorporation in the interactive graphical user interface, the estimated geospatial map overlay comprising an updated visual indication of one or more areas of interest and associated estimated aggregated network performance data.

14. The method of claim 13, wherein the network improvement action comprises adding spectrum, sector additions to reuse spectrum, or adding cell sites.

15. The method of claim 9, wherein the geographic reference data includes map reference data including one or more shapefiles.

16. The method of claim 9, wherein relating the aggregated network performance data with the geographic reference data to generated geographic network data comprises:
   receiving one or more shapefiles including geospatial data associated with areas of interest; and
   grouping, via hexagonal tessellation, the aggregated network performance data and the geospatial data.

17. A network analytics and optimization system for analyzing network performance by a plurality of distinct network service providers and connecting an optimal network provider to a network-switching capable device, the system comprising:
   one or more processors; and
   at least one memory in communication with the one or more processors and storing instructions that, when executed by the one or more processors, are configured to cause the system to:
      receive, via an interface of the network analytical system:
         network data comprising data related to network activity associated with the plurality of distinct network service providers;
         network access data comprising data related to one or more available network access points, geographic reference data comprising data associated with one or more geographic regions, and geographic data indicative of a geographical location of the network-switching capable device;

analyze and aggregate network data to generate aggregated network performance data, wherein the aggregated network performance data includes associated with the plurality of distinct network service providers;

relate the aggregated network performance data with the geographic reference data to generated geographic network data;

determine, based on the geographical location, the optimal network provider of the plurality of distinct network providers, wherein the optimal network provider is the provider with the best aggregated network performance data associated with the geographical location, determine, based on the geographical location, an optimal network access point wherein the optimal network access point is the nearest network access point of the one or more available network access points associated with the optimal network provider;

generating, based at least in part on the geographic network data, a geospatial map overlay for incorporation in an interactive graphical user interface (GUI), the geospatial map overlay comprising a first visual indication of a geographic area associated with the geographical location, a second visual indication depicting aggregated network performance data associated with the geographic area associated with the geographical location, and a third visual indication depicting a ranked list of providers including the optimal network provider;

providing, to the network-switching capable device configured to provide the interactive GUI, the geospatial map overlay; and connecting the network-switching capable device with the optimal network access point.

18. The system of claim 17, wherein the network-switching capable device includes a self-driving vehicle.

19. The system of claim 17, wherein the network-switching capable device includes an autonomous drone.

* * * * *